United States Patent
Andreu et al.

(10) Patent No.: US 9,852,209 B2
(45) Date of Patent: Dec. 26, 2017

(54) BIDIRECTIONAL INTEGRATION OF INFORMATION BETWEEN A MICROBLOG AND A DATA REPOSITORY

(71) Applicant: International Business Machines Corporation, Armonk, NY (US)

(72) Inventors: Carlos N. Andreu, Austin, TX (US); Rajesh Balasubramanian, Cedar Creek, TX (US); William D. Dodd, Austin, TX (US); Chunlong Liang, Austin, TX (US); Eduardo N. Spring, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 603 days.

(21) Appl. No.: 14/251,357

(22) Filed: Apr. 11, 2014

(65) Prior Publication Data
US 2015/0293987 A1 Oct. 15, 2015

(51) Int. Cl.
*G06F 17/30* (2006.01)

(52) U.S. Cl.
CPC .. *G06F 17/30598* (2013.01); *G06F 17/30073* (2013.01); *G06F 17/30705* (2013.01)

(58) Field of Classification Search
CPC combination set(s) only.
See application file for complete search history.

(56) References Cited

U.S. PATENT DOCUMENTS

| | | | |
|---|---|---|---|
| 2008/0028286 A1 | 1/2008 | Chick | |
| 2012/0158863 A1* | 6/2012 | Kikin-Gil | G06F 17/30867 709/206 |
| 2012/0210247 A1 | 8/2012 | Khouri et al. | |
| 2012/0221656 A1* | 8/2012 | Cai | H04L 12/586 709/206 |
| 2014/0059089 A1 | 2/2014 | Bryden | |
| 2014/0122629 A1* | 5/2014 | Ku | G06F 17/30864 709/206 |

(Continued)

OTHER PUBLICATIONS

"Dynamic Aggregation of Contextual Information and Collaborative Practices over Keywords within a Content in an Application Window," [online] ip.com Prior Art Database, Disclosure IPCOM000198784D, Aug. 16, 2010, 4 pg.

(Continued)

*Primary Examiner* — Shyue Jiunn Hwa
(74) *Attorney, Agent, or Firm* — Cuenot, Forsythe & Kim, LLC

(57) ABSTRACT

Arrangements described herein relate to collaborative environments and, more particularly, to use of a microblog to enhance communication in an organization. The present arrangements can include receiving from a first user a first microblog entry into a microblog, identifying at least one keyword associated with the first microblog entry, and assigning to the at least one keyword a tag creating an association between the at least one keyword and at least one data repository. The arrangements further can include establishing bidirectional integration between the microblog and the at least one data repository of information related to the tag creating the association between the at least one keyword and the at least one data repository.

16 Claims, 3 Drawing Sheets

(56) References Cited

U.S. PATENT DOCUMENTS

2014/0244614 A1* 8/2014 Mei .................. G06F 17/3064
 707/708
2015/0293991 A1 10/2015 Andreu et al.

OTHER PUBLICATIONS

"Google Talk," [online] Wikipedia, the Free Encyclopedia, Updated Mar. 26, 2014, [retrieved Apr. 11, 2014] retrieved from the Internet: <http://en.wikipedia.org/wiki/Google_Talk>, 9 pg.

"IBM Sametime," [online] Wikipedia, the Free Encyclopedia, Updated Dec. 31, 2013 [retrieved Apr. 11, 2014] retrieved from the Internet: <http://en.wikipedia.org/wiki/IBM_Sametime>, 4 pg.

"Gmail," [online] Wikipedia, the Free Encyclopedia, Updated Apr. 11, 2014 [retrieved Apr. 11, 2014] retrieved from the Internet: <http://en.wikipedia.org/wiki/IBM_Sametime>, 21 pg.

"IBM Notes," [online] IBM Software, International Business Machines Corporation [retrieved Apr. 11, 2014] retrieved from the Internet: <http://www-03.ibm.com/software/products/en/ibmnotes>, 2 pg.

"Rational Team Concert, An Agile application lifecycle management (ALM) solution," [online] IBM Software, International Business Machines Corporation [retrieved Apr. 11, 2014] retrieved from the Internet: <http://www-03.ibm.com/software/products/en/rtc/>, 2 pg.

"Bugzilla," [online] Bugzilla.org © 1998-2014 by Individual Bugzilla.org Contributors, [retrieved Apr. 11, 2014], retrieved from the Internet: <http://www.bugzilla.org/about/>, 2 pg.

"IBM Connections," [online] IBM Software, International Business Machines Corporation [retrieved Apr. 11, 2014] from the Internet: <htip://www-03.ibm.com/software/products/en/conn>, 2 pg.

"Welcome to our Micro Blog—Facebook," [online] Facebook © 2014 [retrieved Apr. 11, 2014], retrieved from the Internet: <https://www.facebook.com/micklyn3465>, 5 pg.

"Twitter," [online] Wikipedia, the Free Encyclopedia, Updated Apr. 9, 2014, [retrieved Apr. 11, 2014] retrieved from the Internet: <http://en.wikipedia.org/wiki/Twitter>, 36 pg.

IBM: List of IBM Patents or Patent Applications Treated as Related (Appendix P).

Andreu, C.N. et al., "Bidirectional Integration of Information Between a Microblog and a Data Repository", U.S. Appl. No. 14/624,690, filed Feb. 18, 2015, 22 pages.

U.S. Appl. No. 14/251,357, filed Apr. 11, 2014.

U.S. Appl. No. 14/624,690, filed Feb. 18, 2015.

* cited by examiner

BIDIRECTIONAL INTEGRATION OF INFORMATION BETWEEN A MICROBLOG AND A DATA REPOSITORY

BACKGROUND

Arrangements described herein relate to collaborative environments.

A collaborative environment is a computing environment supporting collaboration among individuals. In a collaborative environment, people can collaborate on projects and share information among each other regardless of their respective geographic locations. For example, two or more individuals can, in real-time, work together on documents, spreadsheets, drawings, etc., and share input to reach a common goal or understanding. In this regard, the use of collaborative environments in the workplace can lead to increased productivity, especially on projects requiring input from many different individuals.

SUMMARY

A system includes a processor programmed to initiate executable operations. The executable operations include receiving from a first user a first microblog entry into a microblog, identifying at least one keyword associated with the first microblog entry, and assigning to the at least one keyword a tag creating an association between the at least one keyword and at least one data repository. The executable operations further include establishing bidirectional integration between the microblog and the at least one data repository of information related to the tag creating the association between the at least one keyword and the at least one data repository.

A computer program includes a computer readable storage medium having program code stored thereon. The program code is executable by a processor to perform a method. The method includes receiving, by the processor, from a first user a first microblog entry into a microblog, identifying, by the processor, at least one keyword associated with the first microblog entry, and assigning, by the processor, to the at least one keyword a tag creating an association between the at least one keyword and at least one data repository. The method further includes establishing, by the processor, bidirectional integration between the microblog and the at least one data repository of information related to the tag creating the association between the at least one keyword and the at least one data repository.

DETAILED DESCRIPTION

Figure 1:
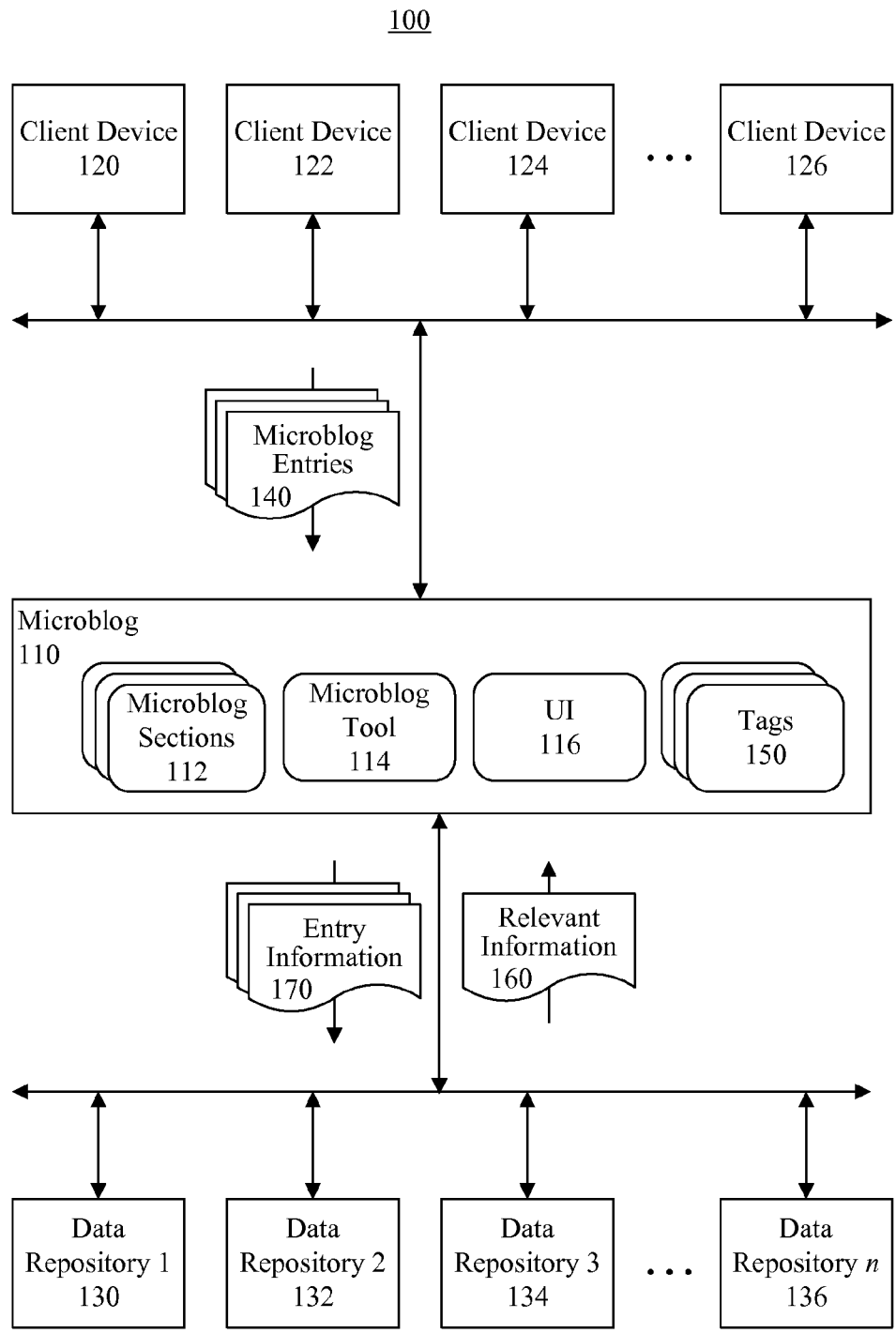
FIG. 1 is a block diagram illustrating an example of a computing environment.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to collaborative environments and, more particularly, to use of a microblog to enhance communication in an organization. In accordance with the inventive arrangements disclosed herein, users can generate microblog entries that are received by a microblog. Keywords within the microblog entries can be identified and tags can be assigned to the keywords. The tags can create associations between the keywords and relevant data repositories. Further, bidirectional integration of information related to the tags can be established between the microblog and the relevant data repositories. For example, the data repositories can be updated with information that is contained in one or more microblog entries, and the microblog can present to users such information that is contained in the data repository. In this regard, information entered by a user of the microblog that is related to a particular subject can be automatically associated with other information relevant to that subject and made readily available to other users of the microblog. Accordingly, the arrangements described herein improve communication within an organization, especially when team members are geographically dispersed among different time zones.

Several definitions that apply throughout this document now will be presented.

As used herein, the term "microblog" means a blog that receives from users, and publishes, informational updates. Posts in a microblog typically are smaller both in actual and aggregated file size than posts in a traditional blog.

As used herein, the term "blog" means a web log that hosts a discussion and/or information and consisting of discrete entries (i.e., posts) published in a web based format.

As used herein, the term "micropost" means a microblog entry by a user into a microblog.

As used herein, the term "keyword" means a word that serves as a meaning of another word, a sentence, a passage or the like.

As used herein, the term "tag" means a term assigned to a keyword that creates an association between the keyword and a relevant data repository. For example, a tag may create an association between the keyword and specific data contained in a relevant data repository. A tag may be embodied as metadata.

As used herein, the term "data repository" means a central location (e.g., one or more databases) where data is stored and maintained.

As used herein, the term "bidirectional integration" means sharing of data between at least two entities in at least two directions.

As used herein, the term "real time" means a level of processing responsiveness that a user or system senses as sufficiently immediate for a particular process or determination to be made, or that enables the processor to keep up with some external process.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), an application specific integrated circuit (ASIC) and a controller.

As defined herein, the term "automatically" means without user intervention.

As defined herein, the term "user" means a person (i.e., a human being).

FIG. 1 is a block diagram illustrating an example of a computing environment 100. The computing environment can include a microblog 110, one or more client devices 120, 122, 124, 126 and one or more data repositories 130, 132, 134, 136. The microblog 110 can be implemented as software and/or firmware executed on one or more processing systems comprising at least one processor and memory, for example on one or more servers. The client devices 120-126 each can be a processing system comprising at least one processor and memory, for example a workstation, desktop computer, mobile computer, laptop computer, notebook computer, tablet computer, smartphone, personal digital assistant, etc. Each data repository 130-136 can comprise one or more data structures hosted on one or more computer readable storage mediums. Examples of data repositories 130-136 include, but are not limited to, one or more data tables of one or more databases, hash tables, and the like. The data repositories 130-136 can store, for example, information used by a collaboration environment, for example a collaborative lifecycle management application. One example of a collaborative lifecycle management application is IBM® Rational Team Concert™, though the present arrangements are not limited to this particular application.

The microblog 110, client devices 120-126 and data repositories 130-136 can be communicatively linked via one or more communication networks. The communication network(s) is/are the medium used to provide communications links between components 110, 120-126, 130-136 of the computing environment 100. The communication network(s) may include connections, such as wire, wireless communication links, or fiber optic cables. The communication network(s) can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

Via the communication network(s), users of the client devices 120-126 can communicate microblog entries 140 to the microblog 110 using any suitable form of communication. For example, the users of the client devices 120-126 can communicate microblog entries 140 (e.g., microposts) from the client devices 120-126 to the microblog 110 via email communications, instant messaging, entries in one or more fields of a webpage/website, and the like. Similarly, the users of the client devices 120-126 can receive information from the microblog 110 on the client devices 120-126 via email communications, instant messaging, presentation of one or more fields of a webpage/website, and the like.

In operation, a user of a client device 120 can communicate to the microblog 110 a microblog entry 140 comprising text, one or more images, audio, video and/or multimedia. The microblog entry 140 can be a micropost to one or more microblog sections 112 of the microblog 110. For example, the microblog entry 140 can be a micropost to a source control section of the microblog 110, a project management section of the microblog 110, a bug tracker section of the microblog 110, a problem management record (PMR) section of the microblog 110, a Wiki and Team Collaboration section of the microblog 110 and/or a Stack-Overflow and Forums section of the microblog 110. It should be noted that these are mere examples of sections of a microblog 110 to which users may provide microblog entries 140. Indeed, any of a variety of microblog sections 112 may be provided to receive microblog entries 140 from users and the present arrangements are not limited in this regard.

The microblog 110 can include, or otherwise access, a microblog tool 114. Responsive to receiving each microblog entry 140, the microblog tool 114 can review the microblog entry 140 to identify any content with which a keyword is associated. For example, the microblog tool 114 can identify one or more keywords contained in text of the microblog entry 140, identify one or more keywords contained in image, audio, video and/or multimedia content contained in the microblog entry 140, identify one or more keywords contained in objects referenced by the microblog entry 140, and the like. A microblog entry 140 may reference an object, such as a text, audio, image and/or multimedia file, by providing the object as an attachment to the microblog entry 140 or providing a link, such as a uniform resource identifier (URI) (e.g., a uniform resource locator (URL)), to the object.

The microblog tool 114 can identify keywords by comparing the information contained in or referenced by the microblog entries 140 to a database of keywords. For example, the microblog tool 114 can automatically parse each word contained in a microblog entry 140, or each word contained in text referenced by the microblog entry 140, and compare each word to the database of keywords. If a microblog entry 140 contains or references an audio or multimedia file, the microblog tool 114 can perform speech recognition on the audio or multimedia file to identify individual words and compare each word to the database of keywords. If a microblog entry 140 contains or references an image or multimedia file, the microblog tool 114 can identify words and/or objects contained in the image or multimedia file to identify individual words and/or objects and compare each word and/or word describing an identified object to the database of keywords.

For each keyword that is identified, the microblog tool 114 can automatically assign a tag 150 creating an association between the keyword and a relevant data repository 130-136, and embed the tag in the microblog entry 140. The tag 150 can be, for example, a hashtag, though the present arrangements are not limited in this regard. Further, the tag 150 can be a link, or hyperlink, to relevant information contained in a data repository 130-136. In one aspect, a keyword identified in a microblog entry 140 that is contained in text of the microblog entry 140 can be converted into, or replaced with, a corresponding tag 150. In an arrangement in which a keyword is contained in content referenced by the microblog entry 140, a tag 150 can be embedded in the microblog entry 140 at a position near a location where the content is referenced, for example above, below or beside such location. For example, if the content is referenced by a hyperlink, a tag 150 can be positioned near the hyperlink. If image, audio, video, and/or multimedia content is embedded in the microblog entry 140, a tag 150 can be positioned near the location of such content in the microblog entry 140, for example above, below or beside such content.

By way of example, a user may generate a microblog entry 140 that contains the text "I fixed bug 5678 yesterday." The microblog tool 114 can identify the keywords "bug 5678" and assign the tag "bug 5678-n" to the keywords, where n is an identifier that uniquely distinguishes the tag "bug 5678-n" from tags assigned to other microblog entries 140 that reference the same bug. Further, the microblog tool can convert the text "bug 5678" into a hyperlink directed to information related to the bug 5678 in a data repository of a defect tracking tool. For instance, the hyperlink can be configured to access relevant database records pertaining to the bug 5678. When the hyperlink is selected by a user, the defect tracking tool can open with the relevant information being displayed, or the relevant information can be presented to the user in the microblog 110, for example via a user interface 116. In one arrangement, the user can modify and/or update the information, for example to modify or update existing tasks, etc. Moreover, any updates (e.g., status updates, modifications, additions, etc.) to the information made by other users can be applied to the information being presented in real time. Accordingly, users always can be presented the most current information.

Accordingly, a user reviewing the microblog entry 140 can select the tag 150 to access the relevant information 160, assuming the user is authorized to access such data. In this regard, appropriate security settings can be implemented to allow users to view data they are authorized to view and to prevent users from viewing data they are not authorized to view. The microblog tool 114 can interface with any suitable user account system, for example a system using the Lightweight Directory Access Protocol (LDAP) application protocol, to enforce security settings contained in the user account system, identify users, etc.

The microblog tool 114 also can automatically process tags 150 assigned to keywords to update information in relevant data repositories 130-136 with information 170 contained in the microblog entries 140 based on the tags 150. Continuing with the previous example, the word "fixed" in the sentence "I fixed bug 5678 yesterday" also can be identified as a keyword and a tag 150 can be assigned to that keyword. For example, the tag "corrected" can be assigned to the keyword "fixed." The microblog tool 114 can process the tags "corrected" and "bug 5678-n" to update the data repository of the defect tracking tool to indicate that the bug 5678 has been corrected. For instance, the microblog tool 114 can interface with the defect tracking tool to update one or more database records related to the bug 5678 in real time.

Further, the microblog tool 114 can store the microblog entries 140 and tags 150 to one or more relevant data repositories 130-136 not only to persist the data, but also to enable information searches using the tags 150. For example, via the user interface 116, users can interface with the microblog tool 114 to search for microblog entries pertaining to a particular subject and/or search the data repositories 130-136 for information pertaining to the subject. Thus, even if original messages for microblog entries are lost, the information contained in the microblog entries will be retained. Moreover, from the microblog 110, the user can search and access information not contained in the microblog entries 140, for example information used by a collaborative lifecycle management application. Also, via the user interface 116, users can enter updates (e.g., status updates, modifications, additions, etc.) to the information. As noted, updates to the information can be propagated in real time so that other users viewing the same information will be presented the updates/essentially when they occur.

Via the user interface 116, the microblog tool 114 can provide a number of different information filters, selectable by the user, to facilitate the information searches. For example, a global filter can be provided to allow a user to view information provided by anyone in microblog entries 140 and/or by updates made to the data repositories 130-136. A user filter can be provided to allow a user to view such information provided by a particular person. A personal (or group) filter can be provided to allow a user to view such information provided by particular people and/or people located in a particular geographic location. A tag filter can be provided to allow a user to view such information associated with a particular tag. A recommended filter can be provided to allow a user to view information relevant to a project or task the user presently is working on or related to information previously provided by the user. In this regard, the microblog tool 114 can analyze information entered into the microblog 110 by the user and/or information accessed by the user using the microblog 110 to identify the related information. A time filter can be provided to allow a user to view information provided at a particular time, provided in a particular time frame and/or provided by users located in a particular time zone. Also, the microblog tool 114 can provide, via the user interface 116, various options/menus that allow users to create custom filters to filter information based on specific criteria. Still, any number of other filters can be provided and the present arrangements are not limited in this regard.

The filters described herein can be implemented using suitable queries, for example queries configured in accordance with structured query language (SQL). Use of the filters can facilitate not only access to information contained in microblog entries 140 and other information contained in the data repositories 130-136, but also facilitate analysis of such information. In this regard, users can selectively filter the information being accessed based on a particular context (e.g., time, time zone, geographic location, project, team, etc.), thus providing highly efficient access to desired information.

Figure 2:
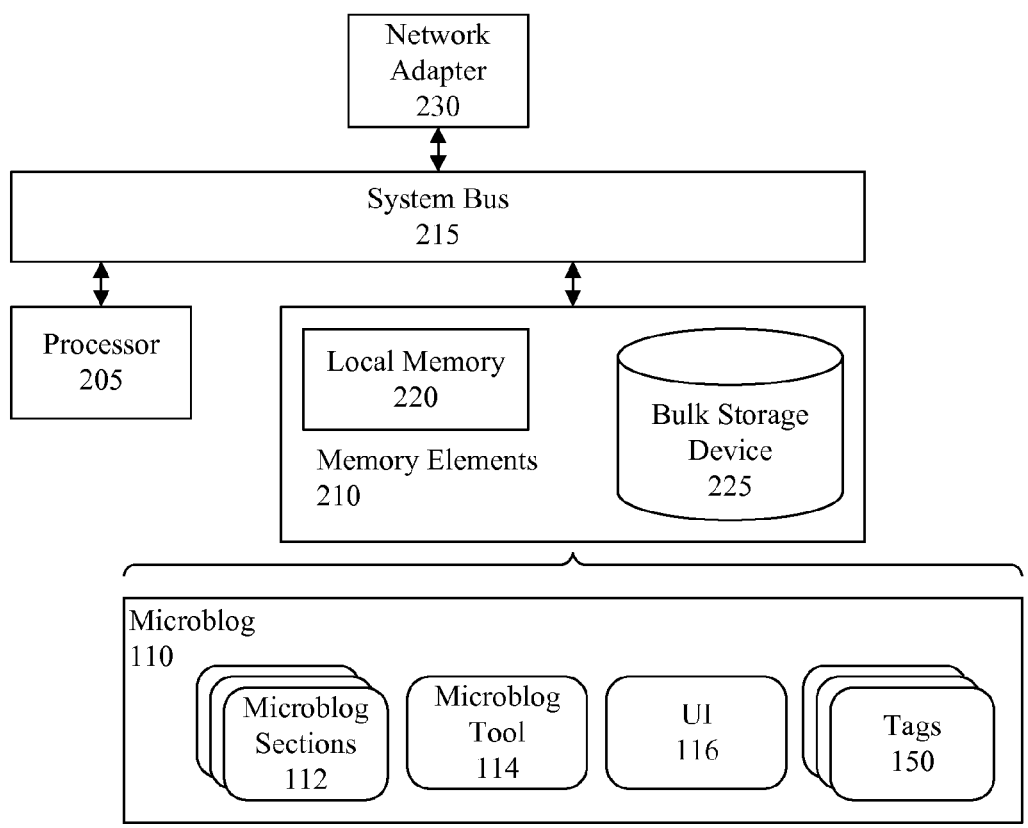
FIG. 2 is a block diagram illustrating example architecture for a data processing system configured to host a microblog.

FIG. 2 is a block diagram illustrating example architecture for a data processing system 200 configured to host the microblog 110 of FIG. 1. The processing system 200 can include at least one processor 205 (e.g., a central processing unit) coupled to memory elements 210 through a system bus 215 or other suitable circuitry. As such, the processing system 200 can store program code within the memory elements 210. The processor 205 can execute the program code accessed from the memory elements 210 via the system bus 215. It should be appreciated that the processing system 200 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The processing system 200 also can include one or more cache memories (not shown) that provide temporary storage of at least some program code in order to reduce the number of times program code must be retrieved from the bulk storage device 225 during execution.

One or more network adapters 230 also can be coupled to processing system 200 to enable processing system 200 to become coupled to other systems, computer systems, remote data storage devices and/or remote printers through intervening private or public networks. Modems, cable modems, transceivers, and Ethernet cards are examples of different types of network adapters 230 that can be used with the processing system 200.

As pictured in FIG. 2, the memory elements 210 can store the microblog 110, including the microblog sections 112, the microblog tool 114, the user interface 116 and the tags 150. The microblog 110 and microblog tool 114, being implemented in the form of executable program code, are executed by the data processing system 200 and, as such, are considered integrated parts of the data processing system 200. Moreover, the microblog 110, microblog sections 112, microblog tool 114, user interface 116 and tags 150, including any parameters and/or attributes utilized by these components, are functional data structures that impart functionality when employed as part of data processing system 200.

Figure 3:
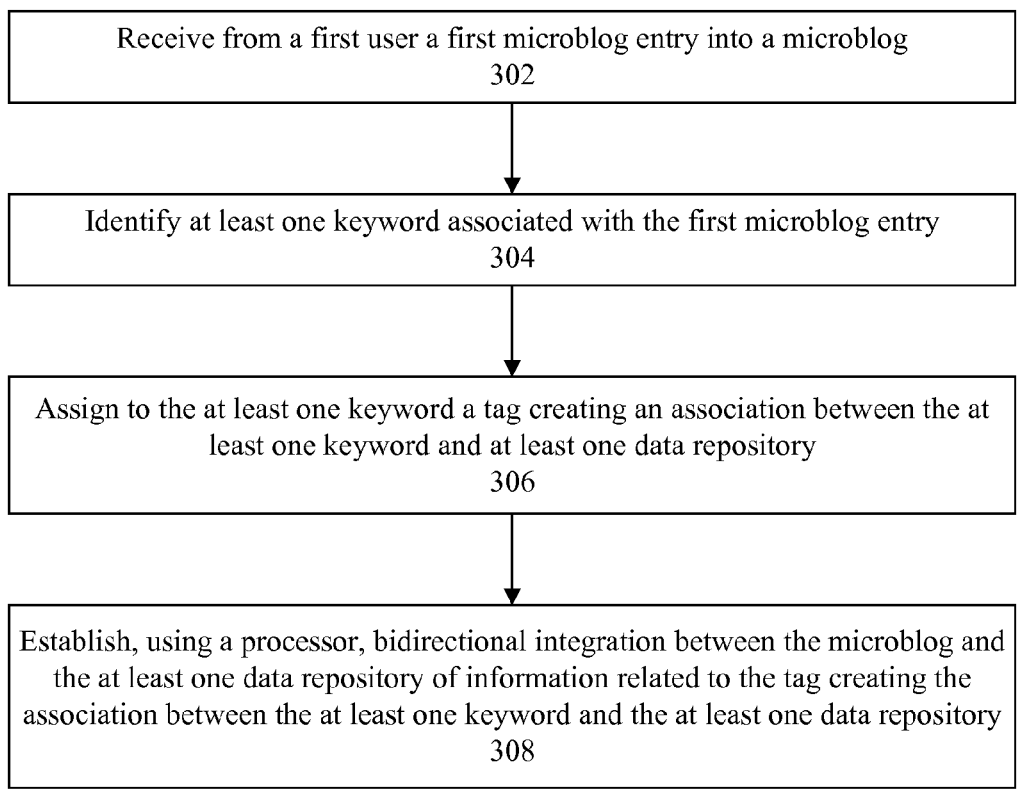
FIG. 3 is a flow chart illustrating an example of a method of establishing bidirectional integration of information between a microblog and a data repository.

FIG. 3 is a flow chart illustrating an example of a method 300 of establishing bidirectional integration of information between a microblog and a data repository. At step 302, a first microblog entry into a microblog can be received from a first user. At step 304, at least one keyword associated with the first microblog entry can be identified. At step 306, a tag creating an association between the at least one keyword and at least one data repository can be assigned to the at least one keyword. At step 308, bidirectional integration between the microblog and the at least one data repository of information related to the tag creating the association between the at least one keyword and the at least one data repository can be established using a processor.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor programmed to initiate executable operations comprising:
   receiving from a first user a first microblog entry into a microblog;
   identifying at least one keyword associated with the first microblog entry;
   assigning to the at least one keyword a tag creating an association between the at least one keyword and at least one data repository, the tag comprising an identifier that uniquely distinguishes the tag from at least one other tag assigned to the at least one keyword for at least a second microblog entry;
   storing, to the at least one data repository, information related to the tag creating the association between the at least one keyword and the at least one data repository;
   converting the at least one keyword associated with the first microblog entry to a hyperlink directed to the information related to the tag at the at least one data repository;
   establishing bidirectional integration between the microblog and the at least one data repository of the information related to the tag creating the association between the at least one keyword and the at least one data repository, wherein the bidirectional integration between the microblog and the at least one data repository enables sharing between the microblog and the at least one data repository, in at least two directions, of the information related to the tag creating the association between the at least one keyword and the at least one data repository; and
   responsive to a second user selecting the hyperlink, presenting to the second user a plurality of database records, from the at least one data repository, pertaining to the keyword in the microblog.

2. The system of claim 1, the executable operations further comprising:
   responsive to receiving the first microblog entry into the microblog, based on the tag, updating information in the at least one data repository with information contained in the first microblog entry.

3. The system of claim 2, wherein the information in the at least one data repository is not the first microblog entry or the second microblog entry.

4. The system of claim 2, the executable operations further comprising:
presenting, in real time, the updated information in the at least one data repository to the second user viewing the information in the at least one data repository via the microblog.

5. The system of claim 1, the executable operations further comprising:
receiving from the first user or the second user a selection of the tag via the microblog; and
responsive to receiving the selection of the tag, presenting to the first user or the second user, via the microblog, the information related to the tag.

6. The system of claim 1, the executable operations further comprising:
receiving from the first user or the second user, via the microblog, a selection of at least one information filter;
filtering, using the at least one information filter, the information which is used by the at least one data repository; and
presenting to the first user or the second user, via the microblog, the filtered information used by the at least one data repository.

7. The system of claim 1, the executable operations further comprising:
identifying at least a second keyword associated with the first microblog entry;
assigning to the second keyword a second tag creating an association between the second keyword and the at least one data repository; and
updating at least one record in the at least one data repository by processing the first tag and the second tag.

8. The system of claim 7, wherein:
the first keyword is a keyword used by a collaborative lifecycle management application;
the second keyword identifies an action corresponding to the keyword used by the collaborative lifecycle management application;
the record in the at least one data repository identifies the keyword used by the collaborative lifecycle management application; and
updating the at least one record in the at least one data repository comprises updating the record to indicate the keyword used by the collaborative lifecycle management application.

9. A computer program product comprising a computer readable storage medium having program code stored thereon, the program code executable by a processor to perform a method comprising:
receiving, by the processor, from a first user a first microblog entry into a microblog;
identifying, by the processor, at least one keyword associated with the first microblog entry;
assigning, by the processor, to the at least one keyword a tag creating an association between the at least one keyword and at least one data repository, the tag comprising an identifier that uniquely distinguishes the tag from at least one other tag assigned to the at least one keyword for at least a second microblog entry;
storing, to the at least one data repository, information related to the tag creating the association between the at least one keyword and the at least one data repository;
converting the at least one keyword associated with the first microblog entry to a hyperlink directed to the information related to the tag at the at least one data repository;
establishing, by the processor, bidirectional integration between the microblog and the at least one data repository of the information related to the tag creating the association between the at least one keyword and the at least one data repository, wherein the bidirectional integration between the microblog and the at least one data repository enables sharing between the microblog and the at least one data repository, in at least two directions, of the information related to the tag creating the association between the at least one keyword and the at least one data repository; and
responsive to a second user selecting the hyperlink, presenting to the second user a plurality of database records, from the at least one data repository, pertaining to the keyword in the microblog.

10. The computer program product of claim 9, the method further comprising:
responsive to receiving the first microblog entry into the microblog, based on the tag, updating information in the at least one data repository with information contained in the first microblog entry.

11. The computer program product of claim 10, wherein the information in the at least one data repository is not the first microblog entry or the second microblog entry.

12. The computer program product of claim 10, the method further comprising:
presenting, in real time, the updated information in the at least one data repository to the second user viewing the information in the at least one data repository via the microblog.

13. The computer program product of claim 9, the method further comprising:
receiving from the first user or the second user a selection of the tag via the microblog; and
responsive to receiving the selection of the tag, presenting to the first user or the second user, via the microblog, the information related to the tag.

14. The computer program product of claim 9, the method further comprising:
receiving from the first user or the second user, via the microblog, a selection of at least one information filter;
filtering, using the at least one information filter, the information which is used by the at least one data repository; and
presenting to the first user or the second user, via the microblog, the filtered information used by the at least one data repository.

15. The computer program product of claim 9, the method further comprising:
identifying at least a second keyword associated with the first microblog entry;
assigning to the second keyword a second tag creating an association between the second keyword and the at least one data repository; and
updating at least one record in the at least one data repository by processing the first tag and the second tag.

16. The computer program product of claim 15, wherein:
the first keyword is a keyword used by a collaborative lifecycle management application;
the second keyword identifies an action corresponding to the keyword used by the collaborative lifecycle management application;

the record in the at least one data repository identifies the keyword used by the collaborative lifecycle management application; and updating the at least one record in the at least one data repository comprises updating the record to indicate the keyword used by the collaborative lifecycle management application.

\* \* \* \* \*